Sept. 23, 1930.  C. J. DUNZWEILER  1,776,552
STORAGE BATTERY
Original Filed March 3, 1924
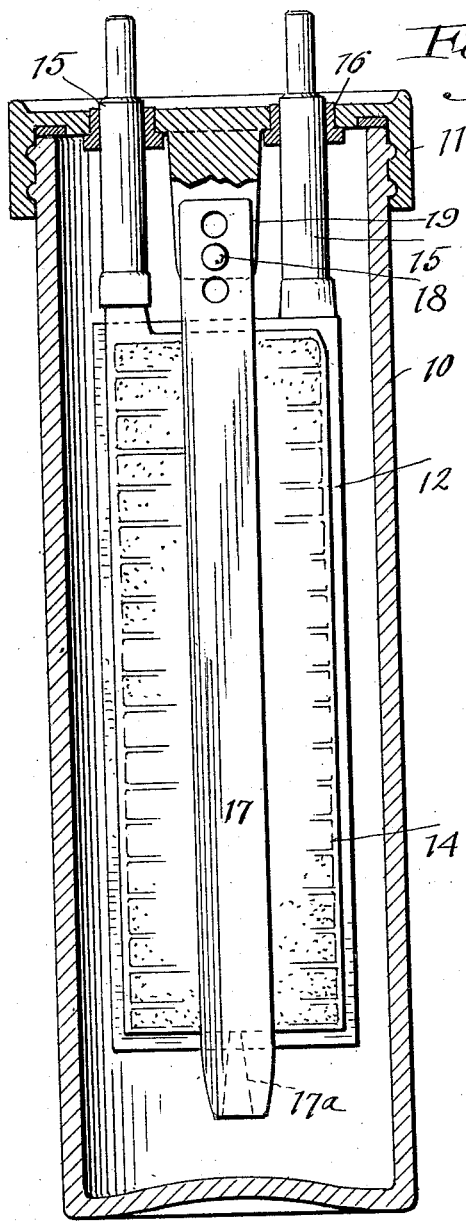
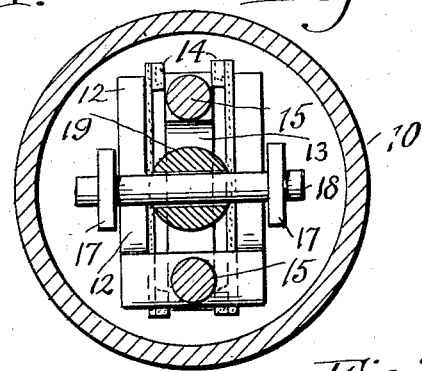
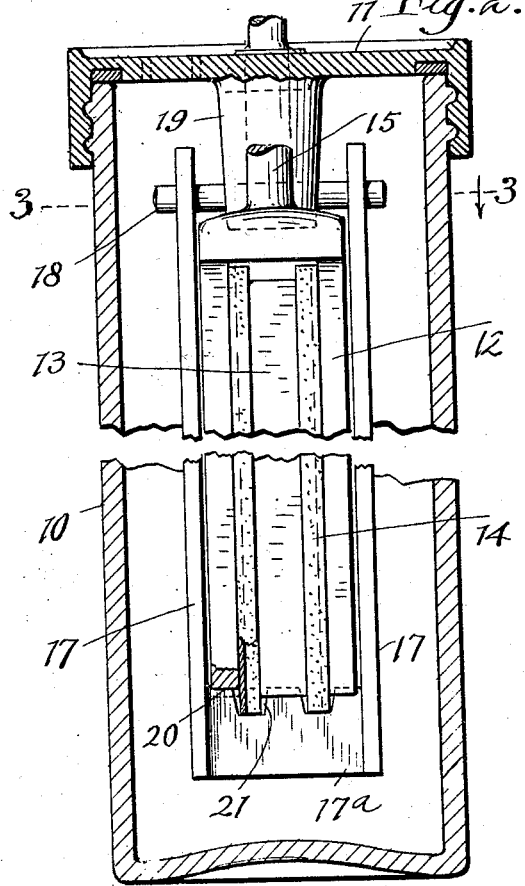
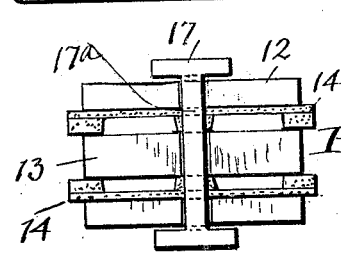
Inventor
Carl J. Dunzweiler
Thurston Kwit Hudson
attys.

Patented Sept. 23, 1930

1,776,552

UNITED STATES PATENT OFFICE

CARL J. DUNZWEILER, OF CLEVELAND, OHIO, ASSIGNOR TO WILLARD STORAGE BATTERY COMPANY, OF CLEVELAND, OHIO, A CORPORATION OF WEST VIRGINIA

STORAGE BATTERY

Application filed March 3, 1924, Serial No. 696,509. Renewed February 11, 1930.

This invention relates to certain improvements in storage batteries.

The battery elements, including the plates and separators, are usually supported on rests at the bottom of the cells or containers. In batteries having the usual rectangular rubber jars or multi-compartment rubber containers, these rests are in the form of ribs extending up from the bottom of the jars or containers transversely of the compartments. In batteries wherein the containers are differently formed, as, for example, of glass, element supporting members commonly in the form of insulating rings or other insulating members, are provided in the bottom of the containers.

The bottom supports, of the nature above stated, in certain kinds of batteries, have the objection that they catch active material falling from the plates, and allow it to build up between the plates so as to cause a short circuit.

The objection of the present invention is to support the battery elements independently of, and clear of the bottom of the container. This is accomplished in this instance by the provision of a device whereby the plates and separators are supported and also held in proper relation against movement in any direction from the cover of the container.

The invention may be further briefly summarized as consisting in certain novel details of construction, and combinations and arrangements of parts which will be described in the specification and pointed out in the appended claims.

In the accompanying sheet of drawings, wherein I have shown the preferred form of the invention, Fig. 1 is a vertical, longitudinal sectional view through the cell of a battery embodying my invention; Fig. 2 is a similar view of a section taken at right angles to the section of Fig. 1; Fig. 3 is a transverse sectional view substantially along the line 3—3 of Fig. 2; and Fig. 4 is a view looking toward the bottom of the battery element, and showing the bottom of the element supporting device.

Referring now to the drawings, 10 represents the container for the battery or cell, which container may be of any suitable shape and formed of any suitable material. In this instance the container is cylindrical, and when formed in this shape is generally of glass. The container 10 has a cover 11, which in this instance is screwed in place.

Inside the container is the usual battery element consisting of the positive and negative plates, of which there may be any number, and the separators between them. In this instance there are two plates 12 of one polarity, and a single plate 13 of the other polarity, separated by insulators or separators 14. The plates have the usual terminal posts 15 extending up through the cover 11, and in this instance through tightly fitting insulating bushings 16.

Instead of supporting the element from the bottom of the container 10 as heretofore, it is supported from the cover 11, and in this instance this is accomplished by a U-shaped supporting device or strap 17, formed of suitable insulating material, such as rubber. This device extends down from above, along the two outer plates 12, and has a narrow bottom member 17ª on which the plates and separators are directly supported and which passes beneath the plates and separators at the middle thereof. As the active material falls chiefly from the exposed or outer faces of the plates, no part of the strap is likely to collect or catch any of this material, and hence liability of a short circuit from this cause is minimized.

The U-shaped strap 17 is in this instance attached to and supported from the cover by a pin 18 which passes through suitable openings near the upper ends of the sides of the strap 17 and through an opening in a depending boss 19 formed on the under side of cover 11.

The vertical sides or arms of the strap 17 prevent the plates and separators from "fanning" or spreading outwardly at their lower ends, and the plates are held against lateral movement in an edgewise direction by notches either in the plates themselves, or in the bottom portion 17ª of the strap. In this instance the plates themselves are notched at the bottom where they rest upon the bottom 17ª of the support, as indicated at 20. The separators extend downwardly below the plates slightly, and the bottom member 17ª of the element support is preferably notched, as shown at 21, to receive the lower projecting edges of the separators.

It will be seen, therefore, that the supporting member 17 not only supports the battery element as a whole, but holds the individual parts of the battery element in proper relation with respect to each other.

I do not desire to be confined to the exact details shown, but aim in my claims to cover all modifications which do not involve a departure from the spirit and scope of my invention as defined in the appended claims.

Having described my invention, I claim:—

1. In a storage battery, a container having a cover, a battery element in the container composed of positive and negative plates and separators, and an element support, supported from the cover and extending downwardly along the sides of the outermost plates and across the lower edges of the plates and separators.

2. In a storage battery, a container having a cover, a battery element in the container having spaced positive and negative plates and a support for said element attached to the cover and extending downwardly from the cover and across the lower edges of the plates transversely thereof.

3. A storage battery comprising a container having a cover and a battery element composed of positive and negative plates and separators therebetween, the plates having terminals connected thereto and extending through the cover, and means other than said separators and independent of the terminals for supporting the battery element above and independently of the bottom of the container, said means rigidly engaging the outer sides of the outermost plates to prevent spreading of the plates.

4. A storage battery comprising a container having a cover and a battery element composed of positive and negative plates and separators therebetween, the plates having terminals connected thereto and extending through the cover, a depending boss on the underside of said cover, and means independent of the terminals for supporting said element from said boss independently of the bottom of the container.

In testimony whereof, I hereunto affix my signature.

CARL J. DUNZWEILER.